United States Patent
Harada et al.

(10) Patent No.: US 12,194,718 B2
(45) Date of Patent: Jan. 14, 2025

(54) RESIN IMPREGNATED DECORATIVE PAPER SHEET AND RESIN IMPREGNATED DECORATIVE PANEL

(71) Applicant: TOPPAN INC., Tokyo (JP)

(72) Inventors: Chiho Harada, Tokyo (JP); Takahiro Iseya, Tokyo (JP)

(73) Assignee: TOPPAN INC., Tokyo (JP)

( * ) Notice: Subject to any disclaimer, the term of this patent is extended or adjusted under 35 U.S.C. 154(b) by 170 days.

(21) Appl. No.: 17/771,001

(22) PCT Filed: Oct. 22, 2020

(86) PCT No.: PCT/JP2020/039763
§ 371 (c)(1),
(2) Date: Apr. 21, 2022

(87) PCT Pub. No.: WO2021/085305
PCT Pub. Date: May 6, 2021

(65) Prior Publication Data
US 2022/0363044 A1 Nov. 17, 2022

(30) Foreign Application Priority Data
Nov. 1, 2019 (IE) .................. 2019-199943

(51) Int. Cl.
*B32B 29/06* (2006.01)
*B32B 5/02* (2006.01)
(Continued)

(52) U.S. Cl.
CPC ............... *B32B 29/06* (2013.01); *B32B 5/18* (2013.01); *D21H 19/66* (2013.01); *B32B 5/022* (2013.01);
(Continued)

(58) Field of Classification Search
CPC ......... B32B 13/00; B32B 15/18; B32B 15/20; B32B 21/02; B32B 21/06; B32B 21/14;
(Continued)

(56) References Cited

U.S. PATENT DOCUMENTS

| 4,500,373 A | 2/1985 | Kubota |
| 2017/0217248 A1 | 8/2017 | Szejwian |

(Continued)

FOREIGN PATENT DOCUMENTS

| EP | 0075646 A1 | 4/1983 |
| EP | 2168762 A1 | 3/2010 |

(Continued)

OTHER PUBLICATIONS

Translation of JPS5816846 A, Aota et al., Jan. 31, 1983. (Year: 1983).*

(Continued)

*Primary Examiner* — Hai Vo (74) *Attorney, Agent, or Firm* — Squire Patton Boggs (US) LLP (57) ABSTRACT

There is provided a resin impregnated decorative paper sheet (2) in which a decorative paper sheet (4) is impregnated with an impregnation resin (5). The decorative paper sheet (4) includes: a base paper sheet (6); a pattern layer (7) provided on a surface (6a) side of the base paper sheet (6); a foamed resin layer (8) formed by a foaming agent arranged on a surface (7a) of the pattern layer (7) or in the pattern layer (7); and a thermosetting resin layer (9) provided on a surface (Continued)

(8a) of the foamed resin layer (8). The thermosetting resin layer (9) contains at least one of an epoxy resin, a casein resin, an acrylic resin, and a urethane resin.

20 Claims, 1 Drawing Sheet (51) Int. Cl.
| | |
|---|---|
| *B32B 5/18* | (2006.01) |
| *B32B 7/12* | (2006.01) |
| *B32B 13/00* | (2006.01) |
| *B32B 15/18* | (2006.01) |
| *B32B 15/20* | (2006.01) |
| *B32B 21/02* | (2006.01) |
| *B32B 21/14* | (2006.01) |
| *B32B 27/30* | (2006.01) |
| *B32B 27/32* | (2006.01) |
| *B32B 27/34* | (2006.01) |
| *B32B 27/36* | (2006.01) |
| *D21H 19/66* | (2006.01) |

(52) U.S. Cl.
CPC ............ *B32B 5/024* (2013.01); *B32B 7/12* (2013.01); *B32B 13/00* (2013.01); *B32B 15/18* (2013.01); *B32B 15/20* (2013.01); *B32B 21/02* (2013.01); *B32B 21/14* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 2255/12* (2013.01); *B32B 2255/26* (2013.01); *B32B 2255/28* (2013.01); *B32B 2260/028* (2013.01); *B32B 2260/046* (2013.01); *B32B 2262/101* (2013.01); *B32B 2607/00* (2013.01)

(58) Field of Classification Search
CPC ............ B32B 2255/12; B32B 2255/26; B32B 2255/28; B32B 2260/028; B32B 2260/046; B32B 2262/101; B32B 2307/4023; B32B 2307/7376; B32B 2451/00; B32B 2607/00; B32B 27/302; B32B 27/308; B32B 27/32; B32B 27/34; B32B 27/36; B32B 27/365; B32B 29/007; B32B 29/06; B32B 3/30; B32B 5/022; B32B 5/024; B32B 5/18; B32B 7/12; D21H 19/66
See application file for complete search history.

(56) References Cited

U.S. PATENT DOCUMENTS

| | | |
|---|---|---|
| 2021/0198845 A1 | 7/2021 | Harima et al. |
| 2022/0363044 A1 | 11/2022 | Harada et al. |

FOREIGN PATENT DOCUMENTS

| | | | |
|---|---|---|---|
| EP | 3206886 B1 | | 11/2020 |
| JP | S5816846 A | * | 1/1983 |
| JP | S58-110250 A | | 6/1983 |
| JP | S59-222348 A | | 12/1984 |
| JP | S62-130849 A | | 6/1987 |
| JP | H06-226944 A | | 8/1994 |
| JP | H07-310417 A | | 11/1995 |
| JP | H09-262956 A | | 10/1997 |
| JP | H10-16374 A | | 1/1998 |
| JP | 2014-069396 A | | 4/2014 |
| JP | 2015-174242 A | | 10/2015 |
| JP | 2018-500195 A | | 1/2018 |
| JP | 2018126904 A | * | 8/2018 |
| WO | WO 2007/142593 A1 | | 12/2007 |
| WO | WO 2019/230373 A1 | | 12/2019 |
| WO | WO 2021/085305 A1 | | 5/2021 |

OTHER PUBLICATIONS

Translation of JP2018126904A, Harima et al., Aug. 16, 2018. (Year: 2018).*
International Preliminary Report on Patentability mailed May 12, 2022 for International Application No. PCT/JP2020/039763, 6 pages.
Extended European Search Report mailed Oct. 17, 2023, for European Patent Application No. 20882853.3, 8 pages.
Non-Final Office Action mailed Aug. 23, 2023, for U.S. Appl. No. 17/059,161, 14 pages.
International Search Report and Written Opinion mailed Jan. 12, 2021 for International Application No. PCT/JP2020/039763, with translation, 7 pages.
International Search Report and Written Opinion mailed Jul. 30, 2019, for International Application No. PCT/JP2019/019135, with English translation, 17 pages.
International Preliminary Report on Patentability mailed Dec. 10, 2020, for International Application No. PCT/JP2019/019135, 9 pages.
Supplemental European Search Report mailed Feb. 22, 2022, for European Patent Application No. 19810551.2, 8 pages.

* cited by examiner

RESIN IMPREGNATED DECORATIVE PAPER SHEET AND RESIN IMPREGNATED DECORATIVE PANEL

CROSS-REFERENCE

This application is a National Stage filing under 35 U.S.C. § 371 of International Patent Application No. PCT/JP2020/039763, filed Oct. 22, 2020, which claims the benefit of and priority to JP Application No. JP2019-199943, filed Nov. 1, 2019, both applications are incorporated herein by reference in their entirety for all purposes.

TECHNICAL FIELD

The present invention relates to a resin impregnated decorative paper sheet and a resin impregnated decorative panel.

BACKGROUND ART

Conventionally, a method for producing a resin impregnated decorative panel has been proposed which includes bringing a metal plate into abutment with a multi-layer body of a resin impregnated decorative paper sheet impregnated with a thermosetting resin and a base material, and then performing heat press molding, thereby obtaining a resin impregnated decorative paper sheet in which the resin impregnated decorative panel and the base material are integrated with each other (see PTL 1, for example). According to the method for producing a resin impregnated decorative panel described in PTL 1, an embossed shape is provided on the metal plate, and an uneven pattern is imparted to the surface of the resin impregnated decorative panel to impart a hand touch feeling thereto. Further, a gross matte expression can also be imparted by adjusting the coarseness and denseness degree of the embossed shape.

However, the method for producing a resin impregnated decorative panel described in PTL 1 requires the preparation of the metal plate for each uneven pattern to be imparted, and thus has a possibility that the cost increases. Therefore, it is conceivable to impart an uneven pattern by providing a foamed resin layer. However, unless raised parts of the uneven pattern are protected, there is a possibility that the contamination resistance and the design stability after long-term storage are lowered.

CITATION LIST

Patent Literature

PTL 1: JP 09-262956 A

SUMMARY OF INVENTION

Technical Problem

The present invention has been made focusing on the above-described problems. It is an object of the present invention to provide a resin impregnated decorative paper sheet and a resin impregnated decorative panel having excellent gross matte expression and hand touch feeling and having improved contamination resistance and design stability after long-term storage while suppressing the cost.

Solution to Problem

A resin impregnated decorative paper sheet according to one aspect of the present invention is a resin impregnated decorative paper sheet in which a decorative paper sheet is impregnated with an impregnation resin, and the decorative paper sheet includes: a base paper sheet; a pattern layer provided on the surface side of the base paper sheet; a foamed resin layer formed by a foaming agent arranged on the surface of the pattern layer or in the pattern layer; and a thermosetting resin layer provided on the surface of the foamed resin layer, in which the thermosetting resin layer contains at least one of an epoxy resin, a casein resin, an acrylic resin, and a urethane resin.

A resin impregnated decorative panel according to another aspect of the present invention includes: the resin impregnated decorative paper sheet; and a base material integrated with the resin impregnated decorative paper sheet.

Advantageous Effects of Invention

According to the present invention, the foaming agent can be foamed by heat press molding and an uneven pattern can be appropriately formed on the surface of the resin impregnated decorative paper sheet. There is no necessity of preparing a metal plate for each uneven pattern, and therefore the resin impregnated decorative paper sheet and the resin impregnated decorative panel having excellent gross matte expression and hand touch feeling can be provided while suppressing the cost. Further, due to the fact that the thermosetting resin layer containing at least one of an epoxy resin, a casein resin, an acrylic resin, and a urethane resin is provided on the surface of the foamed resin layer, raised parts of the uneven pattern can be protected. This makes it possible to provide the resin impregnated decorative paper sheet and the resin impregnated decorative panel having improved contamination resistance and design stability after long-term storage.

DESCRIPTION OF EMBODIMENTS

Hereinafter, a decorative paper sheet, a resin impregnated decorative paper sheet, and a resin impregnated decorative panel according to an embodiment of the present invention will be described with reference to the drawings. The present invention is not limited to the embodiment described below and can also be subjected to modifications, such as design changes, based on the knowledge of those skilled in the art, and embodiments to which such modifications are added are also included in the scope of the present invention. Further, each drawing is exaggerated as appropriate to facilitate understanding.

(Configuration)

Figure 1:
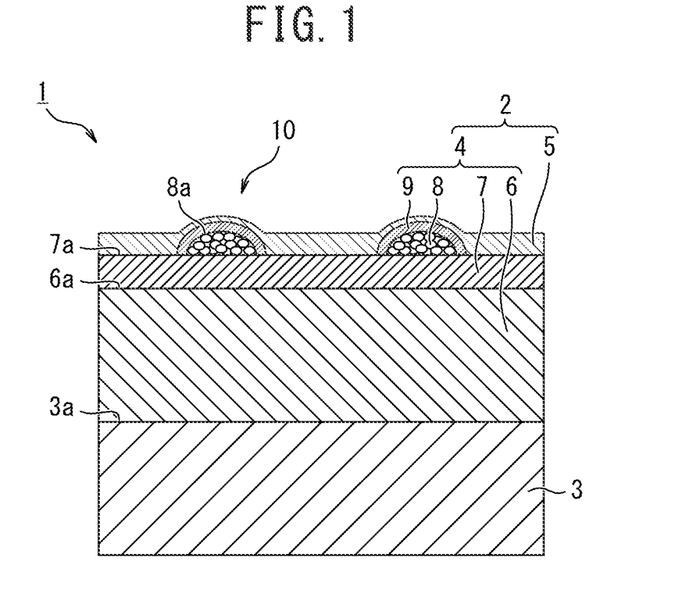
FIG. 1 is a cross-sectional view illustrating a resin impregnated decorative panel after heat press molding.
Figure 2:
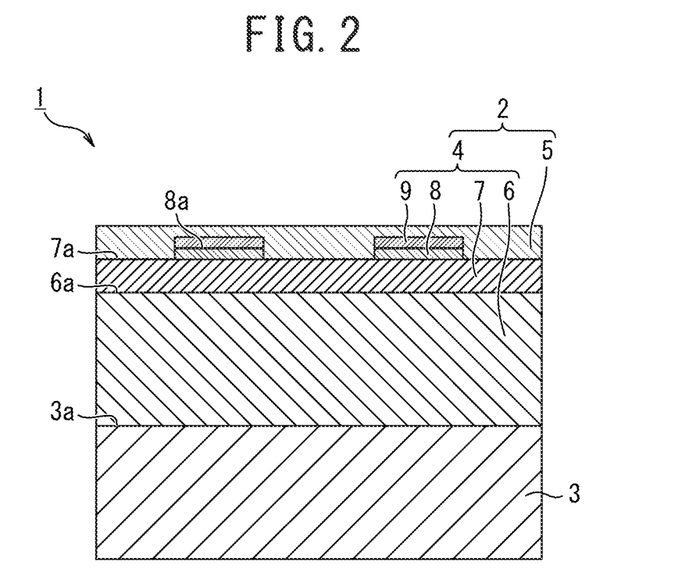
FIG. 2 is a cross-sectional view illustrating a resin impregnated decorative panel before heat press molding.

As illustrated in FIGS. 1 and 2, a resin impregnated decorative panel 1 according to the embodiment of the present invention is a decorative panel obtained by performing heat press molding of a multi-layer body of a resin impregnated decorative paper sheet 2 and a base material 3 to integrate the resin impregnated decorative paper sheet 2 and the base material 3 with each other. More specifically, the resin impregnated decorative panel 1 includes the base material 3 and the resin impregnated decorative paper sheet 2 provided on a surface 3a side of the base material 3. The resin impregnated decorative panel 1 according to the embodiment of the present invention is a resin impregnated decorative panel used for interior decoration for floor surfaces, wall surfaces, ceilings, and the like of buildings, surface decorative materials for furniture, various cabinets, and the like, surface decoration for fittings, vehicle interiors, and the like, for example. FIG. 1 illustrates the resin impregnated decorative panel 1 after heat press molding. FIG. 2 illustrates the resin impregnated decorative panel 1 before heat press molding.

(Base Material)

The type of the base material 3 is not particularly limited, and any base material is usable according to the intended use of the resin impregnated decorative panel 1 to be targeted. For example, woody base materials, such as wood veneer, plywood, laminated wood, particle board, medium density fiberboard, and hard fireboard; fibrous base materials, such as paperboard, woven fabric, non-woven fabric, a resin impregnated paper sheet, and resin impregnated cloth; inorganic base materials, such as a gypsum board, a slate board, a calcium silicate board, a slag gypsum board, a cemented excelsior board, a slag cement board, an autoclaved light-weight concrete board, and a glass fiber reinforced concrete board; metal base materials, such as a steel plate, a brass plate, an aluminum plate, a duralumin plate, and a stainless steel plate; synthetic resin base materials, such as an acrylic resin plate, a styrene resin plate, an acrylonitrile butadiene styrene (ABS) resin plate, a polycarbonate resin plate, a nylon resin plate, a polystyrene resin plate, a polypropylene resin plate, a polyester resin plate, and a glass fiber reinforced plastic plate; and the like or complexes, multi-layer bodies, and the like containing two or more types selected from the above can be adopted.

(Resin Impregnated Decorative Paper Sheet)

The resin impregnated decorative paper sheet 2 according to the embodiment of the present invention is formed by impregnating the entire decorative paper sheet 4 with an impregnation resin 5, followed by drying. The decorative paper sheet 4 includes a base paper sheet 6, a pattern layer 7, foamed resin layers 8, and thermosetting resin layers 9. The pattern layer 7 is provided on a surface 6a of the base paper sheet 6. The foamed resin layers 8 are formed by foaming agents arranged on a surface 7a of the pattern layer 7 or in the pattern layer 7. FIG. 1 illustrates an example in which the foamed resin layers 8 are formed by foaming agents arranged on the surface 7a of the pattern layer 7. The thermosetting resin layers 9 are provided on surfaces 8a of the foamed resin layers 8.

(Base Paper Sheet)

As the base paper sheet 6, a fibrous sheet-like body, such as a paper sheet having a good water absorption property allowing the impregnation with the impregnation resin 5, is usable. For example, a thin paper sheet, a titanium paper sheet, a woodfree paper sheet, a bleached or unbleached kraft paper sheet, and the like can be adopted. In particular, a titanium paper sheet is the most suitable considering both printing suitability and resin impregnation suitability. When utilizing the texture of the surface 3a of the base material 3, it is preferable to use a so-called transparent paper sheet having a property of becoming transparent by the impregnation with the impregnation resin 5. The thickness of the base paper sheet 6 is not particularly limited and is preferably in the range of 20 $g/m^2$ or more and 200 $g/m^2$ or less in terms of basis weight.

(Pattern Layer)

The pattern layer 7 is a layer for imparting a design property by a pattern to the resin impregnated decorative paper sheet 2. The pattern layer 7 is formed using a printing ink, which is obtained by dissolving or dispersing a colorant, such as a dye or a pigment, in a diluting solvent together with an appropriate binder resin, or the like. The type of the printing ink is not particularly limited and may be an oil-based ink or an aqueous ink. More specifically, a common printing ink not having liquid repellency is usable as the printing ink.

In particular, considering the impregnation suitability of the impregnation resin 5, an aqueous ink is the most suitable. The aqueous ink is more compatible with an aqueous solution of the impregnation resin than the oil-based ink. Therefore, when the aqueous ink is used, the decorative paper sheet 4 can be quickly and uniformly impregnated with the impregnation resin 5 in an impregnation step in producing the resin impregnated decorative panel 1, and further the excellent pattern layer 7 by the integration with the impregnation resin 5 is allowed to exhibit strength. The type of the aqueous ink is not particularly limited and is preferably one containing a binder resin containing casein and an emulsion resin as a main component.

Such a binder resin has a property of becoming poorly water-soluble by undergoing a drying step after ink printing. Hence, when a binder resin containing such a binder resin is used, the pattern layer 7 is hard to redissolve in the aqueous solution of the impregnation resin 5 in a resin impregnation step in producing the resin impregnated decorative panel 1, and thus the pattern can be held and further the contamination of the impregnation resin 5 can be prevented.

As the emulsion resin, an acrylic type, a vinyl acetate type, a styrene type, a urethane type, and the like can be adopted, for example. For the binder resin, in addition to casein and an emulsion resin, water-soluble resins, such as polyvinyl alcohol and polyacrylamide, water-soluble polymers, such as polysaccharides and cellulose derivatives, and the like may be used in combination, for example, in order to improve the stability of the ink.

A method for forming the pattern layer 7 is not particularly limited, and any printing method, such as a gravure printing method, an offset printing method, a screen printing method, a flexographic printing method, a letterpress printing method, and an inkjet printing method, is usable. Further, a solid ink layer may be provided between the pattern layer 7 and the base paper sheet 6 for the purpose of coloring the base. When the solid ink layer is provided, any coating method, such as a roll coating method, a gravure coating method, a rod coating method, a knife coating method, an air knife coating method, a spray coating method, a lip coating method, and a die coating method, is also usable, for example, in addition to the above-described various printing methods as a method for forming the solid ink layer.

The type of the pattern formed by the pattern layer 7 is not particularly limited, and any pattern is usable according to the intended use of the resin impregnated decorative panel 1 to be targeted. For example, a wood grain pattern, a stone grain pattern, a cloth pattern, an abstract pattern, a geometric figure, a character, a symbol, a monochromatic solid pattern, and the like or a combination of two or more types selected from the above or the like can be adopted.

(Foamed Resin Layer)

The foamed resin layers 8 are layers for imparting a gross matte expression and a hand touch feeling by an uneven pattern 10 on the surface of the resin impregnated decorative paper sheet 2. The type of the foaming agent is not particularly limited, and any foaming agent is usable. For example, pyrolytic chemical foaming agents, e.g., an azo-type, such as azodicarbonamide and azobisformamide, and a hydrazide type, such as oxybenzenesulfonyl hydrazide and paratoluenesulfonyl hydrazide, microcapsule foaming agents, and the like can be adopted.

In particular, the microcapsule foaming agents are the most suitable. The microcapsule foaming agent has a capsule and a volatile substance encapsuled in the capsule. Then, the microcapsule foaming agent is brought into a foamed state when the volatile substance volatilizes and expands the capsule. As a material of the capsule, a vinylidene chloride-acrylonitrile copolymer and the like are usable, for example. As a material of the volatile substance, aliphatic hydrocarbon and the like are usable, for example.

The foaming agent is preferably one having an average particle size before foaming of ⅔ times or more and 50 times or less the layer thickness of the pattern layer 7. When the average particle size before foaming is less than ⅔ times the layer thickness of the pattern layer 7, there is a possibility that the gross matte feeling and the hand touch feeling are weakened. On the other hand, when the average particle size before foaming is larger than 50 times the layer thickness of the pattern layer 7, there is a possibility that the foamed resin layers 8 after foaming fall off, for example, from the decorative paper sheet 4, weakening the scratch resistance. Herein, the average particle size is an average particle size obtained by microscopic observation. The average particle size obtained by microscopic observation is obtained by microscopically observing the foaming agent, measuring the particle sizes of 100 particles of the microscopically observed foaming agent with image processing software or the like, and then number-averaging the measurement results, for example. As the particle size of the foaming agent, an average value of the major axis diameters and the minor axis diameters of the particles of the foaming agent can be adopted.

The foaming agent is preferably one having an average particle size after foaming of 15 µm or more and 250 µm or less. When the average particle size after foaming is less than 15 µm, there is a possibility that the gross matte feeling and the hand touch feeling are weakened. On the other hand, when the average particle size after foaming is larger than 250 µm, there is a possibility that the foamed resin layers 8 after foaming fall off, for example, from the decorative paper sheet 4, weakening the scratch resistance. The average particle size after foaming is more preferably 30 µm or more and 200 µm or less. Herein, the average particle size of the foaming agent after foaming is the average particle size obtained by microscopic observation as with the average particle size of the foaming agent before foaming. Further, as the particle size of the foaming agent after foaming used for acquiring the average particle size, an average value of the major axis diameters and the minor axis diameters of pores formed by the foaming of the foaming agent can be adopted.

The foaming start temperature of the foaming agent is preferably 100° C. or more and 220° C. or less. When the temperature is less than 100° C., the foaming start timing is early, and therefore the time for heating and pressurizing the foamed resin layers 8 after foaming is prolonged, so that there is a possibility that the foamed resin layers 8 after foaming are crushed, weakening the gross matte feeling and the hand touch feeling. On the other hand, when the temperature is higher than 220° C., there is a possibility that the foamed resin layers 8 are not sufficiently foamed by heat press molding, which is performed by the abutment of a metal plate (mirror plate) in producing the resin impregnated decorative panel 1, weakening the gross matte feeling and the hand touch feeling. The temperature is more preferably 120° C. or more and 200° C. or less.

The type of the uneven pattern 10 formed by the foamed resin layers 8 after foaming is not particularly limited and may or may not be aligned in design with the pattern formed by the pattern layer 7. In particular, considering that the resin impregnated decorative panel 1 having an excellent design property is obtained, a pattern aligned in design with the pattern formed by the pattern layer 7 is the most suitable. When the pattern formed by the pattern layer 7 and the uneven pattern 10 are aligned in design with each other, the arrangement positions of the foamed resin layers 8 are aligned with the pattern formed by the pattern layer 7. More specifically, the foamed resin layers 8 are arranged on parts where a matte texture is desired to be expressed in the pattern formed by the pattern layer 7. For example, the foamed resin layers 8 are arranged on the surface of the pattern layer 7 to cover a dark part in the pattern formed by the pattern layer 7, the dark part having relatively lower brightness than that of the other parts of the pattern. The ratio of the area covered with the foamed resin layers 8 occupied in the area of the dark part is preferably 70% or more. In particular, the ratio is most suitably 90% or more. When the pattern of the pattern layer 7 is a wood grain pattern, the foamed resin layers 8 are arranged in the shape of a vessel pattern aligned in design with the wood grain pattern of the pattern layer 7. The color of the foamed resin layers 8 is not particularly limited and the foamed resin layers 8 may be colorless or colored.

When the foamed resin layers 8 are arranged in the pattern layer 7, the foamed resin layers 8 are mixed into the dark part in the pattern layer 7 formed by the pattern layer 7, the dark part having a relatively lower brightness than that of the other parts of the pattern. The ratio of the volume of the foamed resin layers 8 occupied in the total value of the volume of the dark part and the volume of the foamed resin layers 8 is preferably 70% or more. In particular, the ratio is most suitably 90% or more.

A method for arranging the foamed resin layers 8 is not particularly limited. For example, a method can be adopted which includes printing a printing ink obtained by dispersing the foamed resin layers 8 in a diluting solvent together with an appropriate binder resin on the pattern layer 7. As the binder resin, those containing a thermosetting resin having a urethane bond, such as a two-component curable urethane resin, a curable resin, such as an ionizing radiation curable resin, casein, and an emulsion resin as a main component are usable, for example. As the thermosetting resin, a melamine resin, an epoxy resin, a urea resin, a phenol resin, an unsaturated polyester resin, a diallyl phthalate resin, a benzoguanamine resin, a urethane resin, an aminoalkyd resin, a silicone resin, and the like can be adopted, for example. As the ionizing radiation curable resin, a (meth)acrylate resin, an unsaturated polyester resin, and the like can be adopted, for example.

As a method for printing the printing ink of the foamed resin layers 8 is not particularly limited as with the pattern layer 7, and any printing method, such as a gravure printing method, an offset printing method, a screen printing method, a flexographic printing method, a letterpress printing method, and an inkjet printing method, is usable, for example.

(Thermosetting Resin Layer)

As the thermosetting resin layers 9, a thermosetting resin used in producing known resin impregnated decorative panels is usable. For example, an epoxy resin, a casein resin, an acrylic resin, a urethane resin, a melamine resin, a diallyl phthalate resin, a benzoguanamine resin, an alkyd resin, an unsaturated polyester resin, a phenol resin, a urea resin, and the like can be adopted. In particular, at least one of an epoxy resin, a casein resin, an acrylic resin, and a urethane resin is preferably contained.

A method for printing the thermosetting resin layers 9 is not particularly limited as with the pattern layer 7, and any printing method, such as a gravure printing method, an offset printing method, a screen printing method, a flexographic printing method, a letterpress printing method, and an inkjet printing method, is usable, for example.

The thermosetting resin layers 9 preferably have a thickness of 1 μm or more and 15 μm or less. When the thickness of the thermosetting resin layers 9 is less than 1 μm, there is a possibility that the scratch resistance and the contamination resistance of the resin impregnated decorative paper sheet 2 are lowered. On the other hand, when the thickness of the thermosetting resin layers 9 exceeds 15 μm, there is a possibility that the design property and the design stability after long-term storage of the resin impregnated decorative paper sheet 2 are lowered. The thickness is more suitably 5 μm or more and 10 μm or less.

The thermosetting resin layers 9 are provided in the range of 30% or more of the surface area of the foamed resin layers 8. When the thermosetting resin layers 9 are less than 30% of the surface area of the foamed resin layers 8, there is a possibility that the scratch resistance of the resin impregnated decorative paper sheet 2 is lowered. The range is more suitably 50% or more.

The thermosetting resin layers 9 contain a colored ink. As a vehicle of the colored ink, one type or a mixture of two or more types of chlorinated polyethylene, such as chlorinated polyethylene and chlorinated polypropylene, polyester, polyurethane containing isocyanate and polyol, polyacryl, polyvinyl acetate, polyvinyl chloride, a vinyl chloride-vinyl acetate copolymer, a cellulose resin, a polyamide resin, and the like is used, and an ink formed by adding a pigment, a solvent, various auxiliary agents, and the like to the vehicle is usable.

(Method for Producing Resin Impregnated Decorative Panel)

Next, a method for producing the resin impregnated decorative panel 1 according to the embodiment of the present invention is described.

First, the pattern layer 7 is provided on the surface 6a of the base paper sheet 6, the foamed resin layers 8 are provided on the surface 7a of the pattern layer 7, and the thermosetting resin layers 9 are provided on the surfaces 8a of the foamed resin layers 8, thereby forming the decorative paper sheet 4. Then, the decorative paper sheet 4 is dipped in an aqueous impregnation solution in which the impregnation resin 5 is dissolved or dispersed in water, so that the decorative paper sheet 4 is impregnated with the impregnation resin 5.

As the impregnation resin 5, a thermosetting resin used in producing known resin impregnated decorative panels is usable. For example, a melamine resin, an epoxy resin, a diallyl phthalate resin, a benzoguanamine resin, a urethane resin, an alkyd resin, an unsaturated polyester resin, a phenol resin, a urea resin, and the like can be adopted. The impregnation with the impregnation resin 5 may be performed from the surface side on which the pattern layer 7 is formed of the decorative paper sheet 4 or may be performed from the opposite surface side. Both surfaces may be impregnated one by one in two steps or both surfaces may be impregnated at the same time. An impregnation ratio of the impregnation resin 5 (ratio of the mass of the impregnation resin occupied in the mass of the decorative paper sheet 4 after impregnation) is preferably 20% or more and 80% or less. In particular, the impregnation ratio is most suitably 40% or more and 70% or less. Further, in order to obtain the resin impregnated decorative panel 1 having excellent physical properties, it is important to entirely and uniformly impregnate the base paper sheet 6 with the impregnation resin 5.

Subsequently, the decorative paper sheet 4 impregnated with the impregnation resin 5 is dried, thereby obtaining the resin impregnated decorative paper sheet 2. Subsequently, the resin impregnated decorative paper sheet 2 is placed on the base material 3 (FIG. 2), a metal plate (mirror plate) is brought into abutment with the surface on which the foamed resin layers 8 and the thermosetting resin layers 9 are formed in the resin impregnated decorative paper sheet 2, and then heat press molding of a multi-layer body of the resin impregnated decorative paper sheet 2 and the base material 3 is performed to integrate the resin impregnated decorative paper sheet 2 and the base material 3 with each other, thereby obtaining the resin impregnated decorative panel 1. At that time, the foaming agent is foamed by the heat in the heat press molding, and positions where the foamed resin layers 8 are arranged are raised to form the uneven pattern 10 (FIG. 1). Then, the formed uneven pattern 10 exhibits a gross matte feeling and a hand touch feeling on the resin impregnated decorative panel 1.

An adhesive or the like may or may not be interposed between the base material 3 and the resin impregnated decorative paper sheet 2. Further, a core paper sheet may be interposed as necessary in the same manner as in a method adopted for known melamine resin decorative panels. As the core paper sheet, one in which an appropriate base paper sheet, such as a titanium paper sheet, a bleached or unbleached kraft paper sheet, or a glass fiber non-woven fabric, is impregnated with an uncured thermosetting resin is usable, for example. Further, as the thermosetting resin, any thermosetting resin is usable according to the physical properties and the like required for the resin impregnated decorative panel 1 to be targeted. For example, a melamine resin, an epoxy resin, a diallyl phthalate resin, a benzoguanamine resin, a urethane resin, an alkyd resin, an unsaturated polyester resin, a phenol resin, a urea resin, and the like can be adopted. Examples of the core paper sheet include a phenolic resin impregnated kraft paper sheet, which has been conventionally widely used as a core paper sheet for melamine resin decorative panels.

As a heat press molding method for bonding the resin impregnated decorative paper sheet 2 in a state of being deposited on the base material 3, a method including bringing a metal plate into abutment with the resin impregnated decorative paper sheet 2, and then performing platen press, a cylinder press type continuous lamination method, and the like are usable, for example. In particular, a continuous lamination method using an endless metal belt is preferable. According to the continuous lamination method, the resin impregnated decorative panel 1 with high quality which is free from surface warpage, waviness, or the like, has good interlayer adhesion, and is densely cured and integrated can be continuously produced at a high speed.

When the continuous lamination method is used, the surface shape of the resin impregnated decorative panel 1 is imparted with a shape of the surface shape as it is of a metal plate, an endless metal belt, or an embossed sheet formed of a curable resin or the like used in the continuous lamination method. Hence, by the use of one having a smoothly polished surface, such as a mirror surface state, as the metal plate, the endless metal belt, or the embossed sheet formed of a curable resin or the like, the resin impregnated decorative panel 1 having excellent surface glossiness and smoothness can be obtained.

It is a matter of course that, by the use of a metal plate, an endless metal belt, or an embossed sheet formed of a curable resin or the like having any desired matte feeling or texture as necessary, the resin impregnated decorative panel 1 in any surface finish state can also be obtained according to the intended use of the resin impregnated decorative panel 1 to be targeted.

The resin impregnated decorative panel 1 of the present invention is not limited to the embodiment described in detail above and the embodiment can be implemented by adding various modifications without departing from the gist of the present invention.

As described above, the resin impregnated decorative paper sheet 2 according to the embodiment of the present invention is one in which the decorative paper sheet 4 is impregnated with the impregnation resin 5, and the decorative paper sheet 4 includes the base paper sheet 6, the pattern layer 7, the foamed resin layers 8, and the thermosetting resin layers 9. The pattern layer 7 was provided on the surface 6a side of the base paper sheet 6. The foamed resin layers 8 were formed by the foaming agents arranged on the surface 7a of the pattern layer 7 or in the pattern layer 7. The thermosetting resin layers 9 contain at least one of an epoxy resin, a casein resin, an acrylic resin, and a urethane resin. The thermosetting resin layers 9 were provided on the surfaces 8a of the foamed resin layers 8. Thus, the foaming agent can be foamed by heat press molding and an uneven pattern can be appropriately formed on the surface of the resin impregnated decorative paper sheet. Further, there is no necessity of preparing a metal plate for each uneven pattern 10, and therefore the resin impregnated decorative paper sheet 2 and the resin impregnated decorative panel 1 having excellent gross matte expression and hand touch feeling can be provided while suppressing the cost. Further, the resin impregnated decorative paper sheet 2 and the resin impregnated decorative panel 1 can be provided in which the raised parts of the uneven pattern 10 can be protected by the thermosetting resin layers 9 and the contamination resistance and the design stability after long-term storage are improved.

The thickness of the thermosetting resin layers 9 was set to 1 μm or more and 15 μm or less. Thus, the resin impregnated decorative paper sheet 2 and the resin impregnated decorative panel 1 can be provided in which the deterioration of the design property is suppressed and the durability and the design stability after long-term storage are improved.

The thickness of the thermosetting resin layer 9 was set to 5 μm or more and 10 μm or less. Thus, the resin impregnated decorative paper sheet 2 and the resin impregnated decorative panel 1 can be provided in which the deterioration of the design property is suppressed and the durability and the design stability after long-term storage are further improved.

The thermosetting resin layers 9 were provided in the range of 30% or more of the surface area of the foamed resin layers 8. Thus, the resin impregnated decorative paper sheet 2 and the resin impregnated decorative panel 1 can be provided in which a reduction in scratch resistance and design property is suppressed.

The thermosetting resin layers 9 were provided in the range of 50% or more of the surface area of the foamed resin layers 8. Thus, the resin impregnated decorative paper sheet 2 and the resin impregnated decorative panel 1 can be provided in which a reduction in scratch resistance and design property is more effectively suppressed.

A colored ink was blended in the thermosetting resin layers 9. Thus, the resin impregnated decorative paper sheet 2 and the resin impregnated decorative panel 1 can be provided in which the whitening due to the foamed resin layers 8 is suppressed and the design property is improved.

For the foamed resin layers 8, the average particle size after foaming was set to 15 μm or more and 250 μm or less and the foaming start temperature was set to 100° C. or more and 220° C. or less. Hence, the average particle size after foaming and the foaming start temperature of the foamed resin layers 8 were set to appropriate values, and therefore the foamed resin layers 8 can be foamed in heat press molding by a conventional method for producing a resin impregnated decorative panel, so that the uneven pattern 10 can be appropriately formed on the surface of the impregnated decorative panel 1. This allows the resin impregnated decorative panel 1 to exhibit a gross matte feeling and a hand touch feeling. By adjusting the arrangement positions of the foamed resin layers 8 on the decorative paper sheet 4, any uneven pattern 10 can be imparted to the surface of the resin impregnated decorative panel 1, and there is no necessity of preparing a metal plate for each uneven pattern 10. Therefore, the decorative paper sheet 4 capable of forming the resin impregnated decorative panel 1 having excellent gross matte expression and hand touch feeling can be provided while suppressing the cost.

Since the average particle size after foaming of the foamed resin layers 8 is 15 μm or more and 250 μm or less and the foaming start temperature of the foamed resin layers 8 is 100° C. or more and 220° C. or less, the appropriate uneven pattern 10 can be formed and the decorative paper sheet 4 having excellent matte feeling, hand touch feeling, and scratch resistance can be provided.

Further, in the decorative paper sheet 4 according to the embodiment of the present invention, the pattern formed by the pattern layer 7 and the arrangement positions of the foamed resin layers 8 are aligned with each other, and therefore the resin impregnated decorative panel 1 can be formed in which the pattern formed by the pattern layer 7 and the uneven pattern 10 on the surface of the resin impregnated decorative panel 1 are aligned in design with each other.

In the decorative paper sheet 4 according to the embodiment of the present invention, the average particle size before foaming of the foamed resin layers 8 is ⅔ times or more and 50 times or less the layer thickness of the pattern layer 7. Hence, the appropriate uneven pattern 10 can be formed and the resin impregnated decorative panel 1 having excellent gross matte feeling, hand touch feeling, and scratch resistance can be provided.

The resin impregnated decorative panel 1 according to the embodiment of the present invention includes the resin impregnated decorative paper sheet 2 and the base material 3 integrated with the resin impregnated decorative paper sheet 2. Therefore, the resin impregnated decorative panel 1 having excellent gross matte expression and hand touch feeling can be provided while suppressing the cost.

EXAMPLES

Hereinafter, Examples and Comparative Examples of the resin impregnated decorative panel 1 according to the present invention are described. The present invention is not limited to Examples below.

Example 1

First, as the base paper sheet 6, a titanium paper sheet for decorative paper sheet having good water absorption was prepared. Subsequently, a wood grain pattern was printed on the surface 6a of the base paper sheet 6 with an aqueous ink containing casein as a main component to form the pattern layer 7 having a layer thickness of 10 μm. As a printing method, a gravure printing method was used. Subsequently, a vessel pattern aligned in design with a wood grain pattern of the pattern layer 7 was printed in-line on the surface 7a of the pattern layer 7 with an aqueous ink containing epoxy containing a foaming agent as a main component, and then the foamed resin layers 8 were arranged in the shape of the vessel pattern. As a printing method, a direct gravure printing method was used. As the foamed resin layer 8, one having an average particle size before foaming of 100 μm (10 times the layer thickness of the pattern layer 7), having an average particle size after foaming of 120 μm, and a foaming start temperature of 180° C. was used.

Subsequently, the thermosetting resin layers 9 serving as overcoat layers were printed on the surfaces 8a of the foamed resin layers 8, thereby forming the decorative paper sheet 4. As a printing method, a gravure printing method was used, and an epoxy resin was used for the thermosetting resin layers 9. The thickness of the thermosetting resin layers 9 was set to 0.5 μm, and the range where the thermosetting resin layers 9 were provided was set to 25% of the surface area of the foamed resin layers 8. More specifically, two or more of the foamed resin layers 8 are provided, but, in each of the foamed resin layers 8, the range of 25% of the surface area is covered with the thermosetting resin layer 9. Subsequently, the decorative paper sheet 4 was impregnated with the impregnation resin 5, and then dried in an oven, thereby forming the resin impregnated decorative paper sheet 2. As the impregnation resin 5, an aqueous melamine resin liquid was used. Subsequently, the resin impregnated decorative paper sheet 2 was placed on the base material 3. As the base material 3, a particle board base material was used. Subsequently, the surface on which the foamed resin layers 8 and the thermosetting resin layers 9 were formed in the resin impregnated decorative paper sheet 2 was heat-pressed at about 160° C., and then heat press molding of a multi-layer body of the resin impregnated decorative paper sheet 2 and the base material 3 was performed to integrate the resin impregnated decorative paper sheet 2 and the base material 3 with each other, thereby forming the resin impregnated decorative panel 1 of Example 1. As a plate in the hot press, a flat plate was used. In the resin impregnated decorative panel 1, a region without the foamed resin layer 8 and the thermosetting resin layer 9 of the pattern layer 7 has a gloss finish and a region with the foamed resin layer 8 and the thermosetting resin layer 9 of the pattern layer 7 has a matte finish.

Example 2

In Example 2, a casein resin was used as the thermosetting resin layer 9. Except for the above, the resin impregnated decorative panel 1 was created using the same materials and procedure as those in Example 1.

Example 3

In Example 3, an acrylic resin was used as the thermosetting resin layer 9. Except for the above, the resin impregnated decorative panel 1 was prepared using the same materials and procedure as those in Example 1.

Example 4

In Example 4, a urethane resin was used as the thermosetting resin layer 9. Except for the above, the resin impregnated decorative panel 1 was created using the same materials and procedure as those in Example 1.

Example 5

In Example 5, the thickness of the thermosetting resin layers 9 was set to 1 μm. Except for the above, the resin impregnated decorative panel 1 was created using the same materials and procedure as those in Example 1.

Example 6

In Example 6, the thickness of the thermosetting resin layers 9 was set to 5 μm. Except for the above, the resin impregnated decorative panel 1 was created using the same materials and procedure as those in Example 1.

Example 7

In Example 7, the thickness of the thermosetting resin layers 9 was set to 7 μm. Except for the above, the resin impregnated decorative panel 1 was created using the same materials and procedure as those in Example 1.

Example 8

In Example 8, the thickness of the thermosetting resin layers 9 was set to 10 μm. Except for the above, the resin impregnated decorative panel 1 was created using the same materials and procedure as those in Example 1.

Example 9

In Example 9, the thickness of the thermosetting resin layers 9 was set to 15 μm. Except for the above, the resin impregnated decorative panel 1 was created using the same materials and procedure as those in Example 1.

Example 10

In Example 10, the range of the thermosetting resin layers 9 was increased by 5% to 30% of the surface area of the foamed resin layers 8. Except for the above, the resin impregnated decorative panel 1 was created using the same materials and procedure as those in Example 1.

Example 11

In Example 11, the range of the thermosetting resin layers 9 was increased by 25% to 50% of the surface area of the foamed resin layers 8. Except for the above, the resin impregnated decorative panel 1 was created using the same materials and procedure as those in Example 1.

Example 12

In Example 12, the range of the thermosetting resin layers 9 was increased by 35% to 60% of the surface area of the foamed resin layers 8. Except for the above, the resin impregnated decorative panel 1 was created using the same materials and procedure as those in Example 1.

Example 13

In Example 13, the range of the thermosetting resin layers 9 was increased by 55% to 80% of the surface area of the foamed resin layers 8. Except for the above, the resin impregnated decorative panel 1 was created using the same materials and procedure as those in Example 1.

Example 14

In Example 14, the range of the thermosetting resin layers 9 was increased by 75% to 100% of the surface area of the foamed resin layers 8. Except for the above, the resin impregnated decorative panel 1 was created using the same materials and procedure as those in Example 1.

Example 15

In Example 15, a colored ink was added to the thermosetting resin layer 9. Except for the above, the resin impregnated decorative panel 1 was created using the same materials and procedure as those in Example 1.

Comparative Example 1

In Comparative Example 1, the thermosetting resin layer 9 was omitted. Except for the above, the resin impregnated decorative panel 1 was created using the same materials and procedure as those in Example 1.

(Performance Evaluations)

The resin impregnated decorative panels 1 of Examples 1 to 15 and Comparative Example 1 were subjected to the following performance evaluations.

(Cross Cut Test)

In a cross-cut test, the resin impregnated decorative panel 1 is cross-cut with a cutter, and then it is evaluated whether peeling occurs. A case where no significant peeling is observed in cross-cutting is evaluated as "○" and a case where significant peeling is observed is evaluated as "x".

(Contamination Test)

In a contamination test, the resin impregnated decorative panel 1 was coated with a black crayon and a red ink, the black crayon and the red ink were wiped off with alcohol 1 hour later, and the degree of unwiped black crayon and red ink was evaluated. A case where the degree of unwiped black crayon and red ink was less than 30% was evaluated as "○", a case where the degree was 30% or more and less than 70% was evaluated as "Δ", and a case where the degree was 70% or more was evaluated as (Tactility Evaluation)

In a tactility evaluation, 10 examiners performed the evaluation as a sensory test. A case where the number of the examiners who evaluated the tactility as "Good" was 7 to 10 was evaluated as "○", a case where the number of the examiners was 1 to 6 was evaluated as "Δ", and a case where the number of the examiners was 0 was evaluated as "x".

(Design Evaluation)

In a design evaluation, 10 examiners performed the evaluation as a sensory test. A case where the number of the examiners who evaluated the design as "Good" was 7 to 10 was evaluated as "○", a case where the number of the examiners was 1 to 6 was evaluated as "Δ", and a case where the number of the examiners was 0 was evaluated as (Long-Term Environmental Test)

In a long-term environmental test, the resin impregnated decorative panels 1 were left for 2 months in an environment where the temperature was 40° C. and the humidity was 90%, and then 10 examiners performed the evaluation as a sensory test on changes in design. A case where the number of the examiners who evaluated the changes in design as "Good" was 7 to 10 was evaluated as "○", a case where the number of the examiners was 1 to 6 was evaluated as "Δ", and a case where the number of the examiners was 0 was evaluated as "x".

(Overall Determination)

The resin impregnated decorative panels 1 were totally evaluated by the above-described five items: cross-cut test, contamination test, tactility evaluation, design evaluation, and long-term environmental test. A particularly excellent one was evaluated as "⊚", an excellent one was evaluated as "○", one having almost no problems was evaluated as "Δ", and one having problems was evaluated as "x".

(Evaluation Results)

The evaluation results thereof are shown in Table 1.

TABLE 1

| | Cross cut test | Contamination test | Tactility evaluation | Design evaluation | Long-term environmental test | Overall determination |
|---|---|---|---|---|---|---|
| Ex. 1 | ○ | Δ | Δ | ○ | ○ | ○ |
| Ex. 2 | ○ | ○ | Δ | ○ | ○ | ○ |
| Ex. 3 | ○ | Δ | Δ | Δ | ○ | Δ |
| Ex. 4 | ○ | Δ | Δ | Δ | ○ | Δ |
| Ex. 5 | ○ | Δ | Δ | ○ | ○ | ○ |
| Ex. 6 | ○ | Δ | ○ | ○ | ○ | ⊚ |
| Ex. 7 | ○ | ○ | ○ | ○ | ○ | ⊚ |
| Ex. 8 | ○ | ○ | ○ | Δ | Δ | Δ |
| Ex. 9 | ○ | ○ | Δ | Δ | Δ | Δ |
| Ex. 10 | ○ | Δ | Δ | ○ | ○ | ○ |
| Ex. 11 | ○ | ○ | ○ | Δ | ○ | ○ |
| Ex. 12 | ○ | ○ | ○ | ○ | ○ | ⊚ |
| Ex. 13 | ○ | ○ | ○ | Δ | ○ | ○ |
| Ex. 14 | ○ | ○ | ○ | Δ | Δ | Δ |
| Ex. 15 | ○ | ○ | ○ | ○ | ○ | ⊚ |
| Comp. Ex. 1 | ○ | X | ○ | ○ | X | X |

As shown in Table 1, all of Examples 1 to 15 and Comparative Example 1 had no peeling in the cross-cut test, and thus had no problem with adhesion. However, as compared with Comparative Example 1 in which the thermosetting resin layer 9 was omitted, Examples 1 to 15 in which the thermosetting resin layer 9 was provided had improved contamination resistance and design stability after long-term storage. In particular, as shown by the evaluation results of Examples 1 to 4, those adopting an epoxy resin, a casein resin, an acrylic resin, and a urethane resin as the thermosetting resin layer 9 were excellent in contamination resistance and design stability after long-term storage or had few problems therewith. Further, as shown by the evaluation results of Examples 5 to 9, there was a tendency that, as the thickness of the thermosetting resin layer 9 was increased, the scratch resistance was improved, but the design property was lowered. Further, as shown by the evaluation results of Examples 10 to 14, there was a tendency that, as the coating area of the thermosetting resin layer 9 was increased, the contamination resistance was improved, but the design property was lowered. Further, as shown by the evaluation results of Example 15, by the addition of a colored ink to the thermosetting resin layer 9, the degree of freedom of design expression was increased and, in addition thereto, the whitening of the foamed resin layer 8 was able to be suppressed and the design property was improved. As the overall determination, the resin impregnated decorative panels 1 of Examples 6, 7, 12, 15 were particularly excellent. In Examples 5 to 14, an epoxy resin is used as the thermosetting resin layer 9, but, even when a casein resin, an acrylic resin, a urethane resin, and the like are used in place of the epoxy resin, there is no significant difference in the basic physical properties and substantially equivalent results are obtained.

Although the above description has been made with reference to a limited number of embodiments, the scope is not limited thereto and modifications of the embodiment based on the above disclosure are obvious to those skilled in the art.

REFERENCE SIGNS LIST 1 resin impregnated decorative panel
2 resin impregnated decorative paper sheet
3 base material
3a surface
4 decorative paper sheet
5 impregnation resin
6 base paper sheet
6a surface
7 pattern layer
7a surface
8 foamed resin layer
8a surface
9 thermosetting resin layer
10 uneven pattern

The invention claimed is:

1. A resin impregnated decorative paper sheet in which a decorative paper sheet is impregnated with an impregnation resin layer,
the decorative paper sheet comprising:
a resin impregnated base paper sheet;
a pattern layer provided on a surface side of the base paper sheet;
a foamed resin layer formed by a foaming agent arranged on a surface of the pattern layer or in the pattern layer; and
a thermosetting resin layer provided on a surface of the foamed resin layer, wherein
a range of 25% to 80% of a surface area of the foamed resin layer is covered with the thermosetting resin layer,
the thermosetting resin layer contains at least one of an epoxy resin, a casein resin, an acrylic resin, or a urethane resin,
the base paper sheet is entirely impregnated with the impregnation resin, and
the impregnation resin layer and the thermosetting resin layer are made of a different material.

2. The resin impregnated decorative paper sheet according to claim 1, wherein the thermosetting resin layer has a thickness of 1 μm or more and 15 μm or less.

3. The resin impregnated decorative paper sheet according to claim 2, wherein the thermosetting resin layer has a thickness of 5 μm or more and 10 μm or less.

4. The resin impregnated decorative paper sheet according to claim 3, wherein the thermosetting resin layer is provided in a range of 30% to 80% of the surface area of the foamed resin layer.

5. The resin impregnated decorative paper sheet according to claim 3, wherein the thermosetting resin layer contains a colored ink.

6. The resin impregnated decorative paper sheet according to claim 3, wherein the foaming agent has an average particle size after foaming of 15 μm or more and 250 μm or less and a foaming start temperature of 100° C. or more and 220° C. or less.

7. The resin impregnated decorative paper sheet according to claim 2, wherein the thermosetting resin layer is provided in a range of 30% to 80% of the surface area of the foamed resin layer.

8. The resin impregnated decorative paper sheet according to claim 2, wherein the thermosetting resin layer contains a colored ink.

9. The resin impregnated decorative paper sheet according to claim 2, wherein the foaming agent has an average particle size after foaming of 15 μm or more and 250 μm or less and a foaming start temperature of 100° C. or more and 220° C. or less.

10. The resin impregnated decorative paper sheet according to claim 1, wherein the thermosetting resin layer is provided in a range of 30% to 80% of the surface area of the foamed resin layer.

11. The resin impregnated decorative paper sheet according to claim 10, wherein the thermosetting resin layer is provided in a range of 50% to 80% of the surface area of the foamed resin layer.

12. The resin impregnated decorative paper sheet according to claim 11, wherein the thermosetting resin layer contains a colored ink.

13. The resin impregnated decorative paper sheet according to claim 11, wherein the foaming agent has an average particle size after foaming of 15 μm or more and 250 μm or less and a foaming start temperature of 100° C. or more and 220° C. or less.

14. The resin impregnated decorative paper sheet according to claim 10, wherein the thermosetting resin layer contains a colored ink.

15. The resin impregnated decorative paper sheet according to claim 10, wherein the foaming agent has an average particle size after foaming of 15 μm or more and 250 μm or less and a foaming start temperature of 100° C. or more and 220° C. or less.

16. The resin impregnated decorative paper sheet according to claim 1, wherein the thermosetting resin layer contains a colored ink.

17. The resin impregnated decorative paper sheet according to claim 1, wherein the foaming agent has an average particle size after foaming of 15 μm or more and 250 μm or less and a foaming start temperature of 100° C. or more and 220° C. or less.

18. The resin impregnated decorative paper sheet according claim 1, wherein a pattern formed by the pattern layer and an arrangement position of the foamed resin layer are aligned with each other.

19. The resin impregnated decorative paper sheet according to claim 1, wherein the foaming agent has an average particle size before foaming of 2/3 times or more and 50 times or less a layer thickness of the pattern layer.

20. A resin impregnated decorative panel comprising:
the resin impregnated decorative paper sheet according to claim 1; and
a base material integrated with the resin impregnated decorative paper sheet.

* * * * *